Aug. 9, 1966    D. F. PATTERSON    3,264,774
ARTIFICIAL BAIT
Filed May 28, 1964
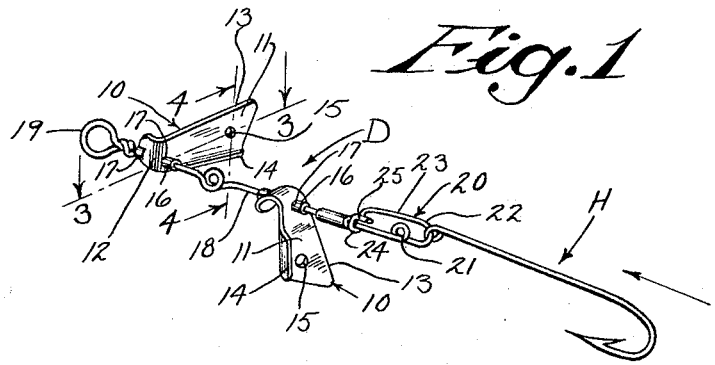
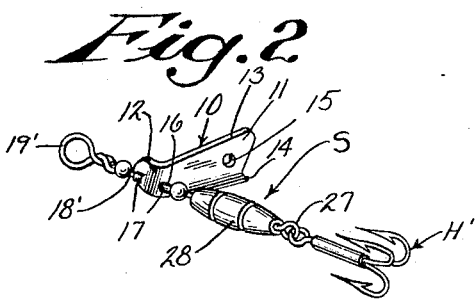
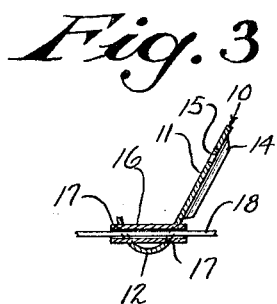
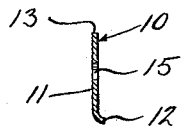
INVENTOR
DELBERT F. PATTERSON
BY
George W. Wright, Jr.

United States Patent Office
3,264,774
Patented August 9, 1966

3,264,774
ARTIFICIAL BAIT
Delbert F. Patterson, Wild Rose, Wis.
Filed May 28, 1964, Ser. No. 371,028
1 Claim. (Cl. 43—42.14)

This invention appertains to fishing tackle and equipment, and more particularly to a new and improved spinner, such as is used by fly rod anglers.

In the past, there have been many types of artificial bait used, and different variations of spoons, spinners and the like for trolling and casting. Many of these different styles and forms have heretofore been patented. One very efficient and effective lure is described in U.S. Patent 2,212,294, issued August 20, 1940, to Charles F. Larzelere, assignor of one-half interest to Delbert F. Patterson. This present invention relates primarily to certain structural refinements and improvements over the aforementioned patent. The lure described in the aforementioned patent was, as previously mentioned, quite effective and efficient, but the light reflective qualities of the blade and spinning and wobbling action were not as effective as they could be. Further, the holes at the tang or shank portion of the blade would fray and wear a flexible nylon leader. Also the rod upon which the blades were mounted could become bent or deformed between the mounting apertures and thus hinder the proper spinning motion of the blade.

It is, therefore, a primary object of the present invention to provide an improved artificial bait in which in particular the spinner or blade has been designed to take advantage of more light reflection and changes in light pattern.

Another important object of my present invention is to provide a tube which is press fitted within the apertures of the tang or shank portion of the blade and which acts as a bearing surface and adapts the blade to be readily mounted on flexible nylon leader material without fraying it.

A further object of the present invention is to provide a single aperture adjacent the outer end of the blade and to bend or turn over one edge of the blade so that the aperture and turned edge cooperate to give a better reflective and light pattern, making the blade into a reflex and also this puts the blade into an imbalance, giving both a spinning and wobbling action, which heretofore has not been possible in spinners.

A salient feature of my present invention resides in an improved artificial bait wherein the rod for mounting the spinner and hook is improved, and of a single length bent to provide a means for attaching the line at one end and a spring catch for securing the hook at the other end with a single intermediate loop to provide a stop and separation for the spinners in one form of the invention.

A still further object of the present invention is to provide an artificial bait, which is relatively simple in construction, reliable in its operation and not liable to get out of order.

With these and other objects in view, and to the end of attaining any other advantage hereinafter appearing, this invention consists in certain features of construction, combination and arrangement of parts, hereinafter described, pointed out in the claim and illustrated in the accompanying drawings, in which:

FIGURE 1 is a perspective view of a dual style spinner constructed in accordance with the principles of the present invention;

FIGURE 2 is a perspective view of a single or individual spinner type;

FIGURE 3 is a longitudinal horizontal section taken through the spinner as mounted on the rod, the section being represented by the line 3—3 of FIGURE 1, looking in the direction of the arrows;

FIGURE 4 is a vertical transverse section through the blade, the section being taken on the line 4—4 of FIGURE 1, looking in the direction of the arrows, and FIGURE 5 is a top plan view of the spinner per se shown in its flat form prior to bending the tang or shank portion for insertion of the bearing tube.

Referring now to the drawings in detail, wherein similar reference characters designate corresponding parts throughout the several views, the letter D generally indicates one type of the improved dual spinner lure and the letter S generally indicates one type of the improved single spinner lure.

Referring now more particularly to that form of the invention shown in FIGURE 1 of the drawings, it can be seen that the spinner or blade 10 is used in pairs and for purposes of illustration the spinner 10 has been shown in a longitudinal, horizontal position as well as a vertical position. In any event, both of the spinners 10 are identical and include a main body portion 11 and a tang or shank portion 12. The body or blade portion 11 is substantially trapezium like in configuration and the upper leading edge 13 is relatively straight and flat, while the lower trailing edge 14 is turned and bent rearwardly. The blade 11 is so shaped (as is standard with spinners) that it will spin in the direction of the leading edge and this leading edge 13 of course cuts the water first. The bent or inturned trailing edge 14 also gives a swirling motion to the water thus enhancing the reflective and dancing effect of the light. Adjacent the outer end of the blade or body 11, a single aperture 15 is punched or drilled through the blade. Thus, it can be seen that fish approaching the hook H in the direction of the arrow FIGURE 1, will have the light diffused and reflected in a more efficient manner due to the inturned edge 14 and the aperture 15. Further, this aperture, as well as the inturned edge, places the blade off balance, so that the blade is given both a spinning and wobbling action heretofore not found in spinners.

Another important feature of the blade resides in the elongated tubular member 16 and when the tang or shank of the flat form of the blade shown in FIGURE 3, is curved or bent as shown in FIGURES 1 to 3, inclusive, the tube is fitted within the aperture 17, which then becomes aligned as shown better in FIGURE 3 of the drawings. It can be seen that the tube can be secured in position in any desired manner, by spring tension of the shank or tang portion 12, by press fit, or the like. When the spinner is utilized in the dual form D, the bait body is constructed from a single length of spring wire 18, the forward end of which is fashioned into an eye 19 to accommodate a fishing line (not shown) and its opposite end is bent into a spring coiled fastener 20. This spring coiled fastener is formed by making a loop 21 and a return bend 22, to define a stretch 23, substantially parallel to the main rod body. This stretch 23 terminates in a hook 24 and it will be noted that the upper opposite end 25 of the hook extends rearwardly and parallel with the stretch 23 and this aids in preventing the hook H from slipping off the end thereof. In other words should the hook H slip on stretch 23 and under hook portion 24 stretch 25 will restrain hook H from further movement and from slipping off of the spring coil fastener. Loop 21 also cooperates with the return bend 22 to position the hook at the rear portion of the rod 18. Intermediate the eye portion 19 and the spring fastener 20 I provide a loop 26 and this loop acts as a stop to separate the dual spinners.

From the foregoing, it can be seen that I have provided a greatly improved artificial bait which not only is an improvement over Patent 2,212,294 but which distinguishes patentably thereover, and which has decided advantages not found in the dual spinner type shown and described in the prior patent.

Attention is now directed to FIGURE 2, in which I illustrate one form of a single spinner lure and again, the spinner 10 is dentical and is mounted on a spring wire rod body 18′ which is provided with an eye 19′ for the fish line, and a smaller eye 27 to the rear thereof upon which is mounted a hook or hooks H′. In this form of the invention, it is advantageous to provide a small weight 28 preferably to the rear of the spinner 10 and between the spinner and hooks H′. It is also important to note that the use of the bearing tube 16 particularly adapts the spinner to be used on a flexible nylon leader without fraying or damaging the same and the cross-section in FIGURE 3 of the drawings illustrates how this could be accomplished.

From the above description, particularly of the two forms of my invention, it is believed that all of the features and advantages of the same will be readily apparent to those skilled in the art, and it will, of course, be understood that certain changes in the form, proportion and minor details of construction may be resorted to without departing from the spirit of the invention or scope of the appended claim.

What is claimed as new is:

An artificial bait including in combination, a longitudinal elongated bendable rod providing a body having means at one end for attachment of a fishing line, a spring hook retaining fastener formed at the opposite end by bending said body upon itself to form a coiled loop spring and a return bend extending inwardly and beyond the coiled loop spring to define a parallel stretch terminating in a U-shaped catch for quick separable engagement with the body portion of the rod, means associated with said U-shaped catch to prevent the accidental loss of the hook associated therewith, including a rearwardly extending stretch on said U-shaped portion parallel to said first mentioned parallel stretch, a pair of spinners each having a tang shank portion and a main blade body portion, a tube extending transversely of said spinner through said shank portion, said tube receiving a respective portion of said bendable wire rod body, said blade portion being of a general trapezium shape with a straight leading edge in the direction of rotation, said blade portion comprising a major planar portion and a minor inturned bend portion at the trailing edge and an aperture adjacent the outer end of said blade portion, said bendable wire rod body being formed with an intermediate loop to separate the mounting portions of said spinners whereby the inturned edge and aperture cooperate to act as a light reflective surface and to provide an imbalance in the blades for both spinning and wobbling action.

References Cited by the Examiner

UNITED STATES PATENTS

| | | | |
|---|---|---|---|
| 418,200 | 12/1889 | Loftie | 43—42.14 |
| 723,045 | 3/1903 | Shaffer | 43—42.14 |
| 865,676 | 9/1907 | Brown | 43—42.17 |
| 1,062,980 | 5/1913 | Lewis | 43—42.19 |
| 1,339,189 | 5/1920 | Frensdorf | 43—42.19 |
| 1,522,451 | 1/1925 | Hayes | 43—42.19 |
| 2,013,898 | 9/1935 | Ridenour | 43—42.17 X |
| 2,212,294 | 8/1940 | Larzelere | 43—42.14 |
| 2,911,753 | 11/1959 | Beckett | 43—42.14 X |

FOREIGN PATENTS

| | | |
|---|---|---|
| 911,301 | 3/1946 | France. |
| 439,134 | 11/1935 | Great Britain. |

ABRAHAM G. STONE, *Primary Examiner.*

R. L. HOLLISTER, *Assistant Examiner.*